(12) United States Patent
Lu et al.

(10) Patent No.: US 12,166,228 B2
(45) Date of Patent: Dec. 10, 2024

(54) PORTABLE ELECTRONIC DEVICE WITH A BATTERY SWITCHING FUNCTION

(71) Applicant: Winmate Inc., New Taipei (TW)

(72) Inventors: Ku-Ching Lu, New Taipei (TW); Yueh-Tsai Weng, New Taipei (TW); Tsung-Yu Chou, New Taipei (TW)

(73) Assignee: WINMATE INC., New Taipei (TW)

( * ) Notice: Subject to any disclaimer, the term of this patent is extended or adjusted under 35 U.S.C. 154(b) by 542 days.

(21) Appl. No.: 17/533,912

(22) Filed: Nov. 23, 2021

(65) Prior Publication Data
US 2023/0163399 A1    May 25, 2023

(51) Int. Cl.
| H01M 10/46 | (2006.01) |
| H01M 50/247 | (2021.01) |
| H01M 50/262 | (2021.01) |
| H01M 50/269 | (2021.01) |
| H02J 7/00 | (2006.01) |
| H02J 9/06 | (2006.01) |

(52) U.S. Cl.
CPC ....... *H01M 50/269* (2021.01); *H01M 50/247* (2021.01); *H01M 50/262* (2021.01); *H02J 7/0013* (2013.01); *H02J 7/0042* (2013.01); *H02J 7/0063* (2013.01); *H02J 7/007188* (2020.01); *H02J 9/06* (2013.01); *H01M 2220/30* (2013.01)

(58) Field of Classification Search
CPC .. H02J 7/0063; H02J 7/0013; H02J 7/007188; H02J 7/0042; H02J 9/06; H01M 50/262; H01M 50/247; H01M 2220/30; H01M 50/269; H01M 10/44

USPC .............. 320/107, 110, 114, 115, 116
See application file for complete search history.

(56) References Cited

U.S. PATENT DOCUMENTS

| 6,806,681 | B1 * | 10/2004 | Cheiky | G03B 7/26 |
| | | | | 396/539 |
| 2007/0026298 | A1 * | 2/2007 | Chen | H04M 1/0262 |
| | | | | 429/97 |
| 2017/0165828 | A1 * | 6/2017 | Fleischmann | B65D 85/00 |
| 2019/0041909 | A1 * | 2/2019 | Pakula | G06F 1/1626 |

FOREIGN PATENT DOCUMENTS

EP          1752859 A2 *  2/2007  ........... G06F 1/1626

* cited by examiner

*Primary Examiner* — Edward Tso
(74) *Attorney, Agent, or Firm* — MUNCY, GEISSLER, OLDS & LOWE, P.C.

(57) ABSTRACT

A portable electronic device with a battery switching function is provided. The portable electronic device has two battery switching assemblies corresponding to each battery. Each battery switching assembly has a primary fastener and a secondary fastener corresponding to each other. When the primary fastener is engaged with the secondary fastener, the secondary fastener engages with the corresponding battery so that the battery cannot be detached from the casing of the portable electronic device. When the primary fastener and the secondary fastener are disengaged, the Hall sensor corresponding to the primary fastener sends a signal to a control unit. Then the control unit turns off the power supply of the corresponding battery and switches to another battery to supply power, or closes a specific application to reduce power consumption.

7 Claims, 14 Drawing Sheets

PORTABLE ELECTRONIC DEVICE WITH A BATTERY SWITCHING FUNCTION

BACKGROUND OF THE INVENTION

1. Field of the Invention

The present invention relates to a portable electronic device, especially related to battery switching function in portable electronic devices.

2. Description of the Prior Arts

In the prior art as shown in FIG. 11, the connection between the battery 90 and the casing 91 of a conventional portable device is used to make the system automatically detect whether the battery is unplugged. The casing 91 is provided with a plurality of power supply pins 911 and at least one detection pin 912 corresponding to the electrical connection of the battery 90. When the battery 90 is removed from the casing 91, the socket 901 of the battery 90 is separated from the pins 911 and 912 of the casing 91. Because the detection pin 912 is shorter, the socket 901 must be separated from the detection pin 912 first to form an open circuit. Thus, the system detects that the battery 90 is about to be disconnected by detecting the disconnection signal of the detection pin 912, and the system switches the power supply source to another battery.

The length difference between the power supply pins 911 and the detection pin 912 is not huge, and the action of unplugging the battery 90 is usually a continuous action. After the detection pin 912 is disconnected, the power supply pins 911 are also disconnected in a very short time. However, the system needs at least 0.03 seconds of response time to switch the power source to another battery. If the time difference between the open circuits of the power supply pins 911 and the detection pin 912 is less than 0.03 seconds, it will make the system too late to switch the power source. It will still cause the components to be interrupted due to abnormal power failure and even cause the components to be damaged.

SUMMARY OF THE INVENTION

A portable electronic device with a battery switching function is provided. The portable electronic device has two battery switching assemblies corresponding to each battery. Each battery switching assembly has a primary fastener and a secondary fastener corresponding to each other. When the primary fastener is engaged with the secondary fastener, the secondary fastener engages with the corresponding battery so that the battery cannot be detached from the casing of the portable electronic device. When the primary fastener and the secondary fastener are disengaged, the Hall sensor corresponding to the primary fastener sends a signal to a control unit. Then the control unit turns off the power supply of the corresponding battery and switches to another battery to supply power, or closes a specific application to reduce power consumption.

Other objectives, advantages and novel features of the invention will become more apparent from the following detailed description when taken in conjunction with the accompanying drawings.

DETAILED DESCRIPTION OF THE EMBODIMENTS

Figure 1:
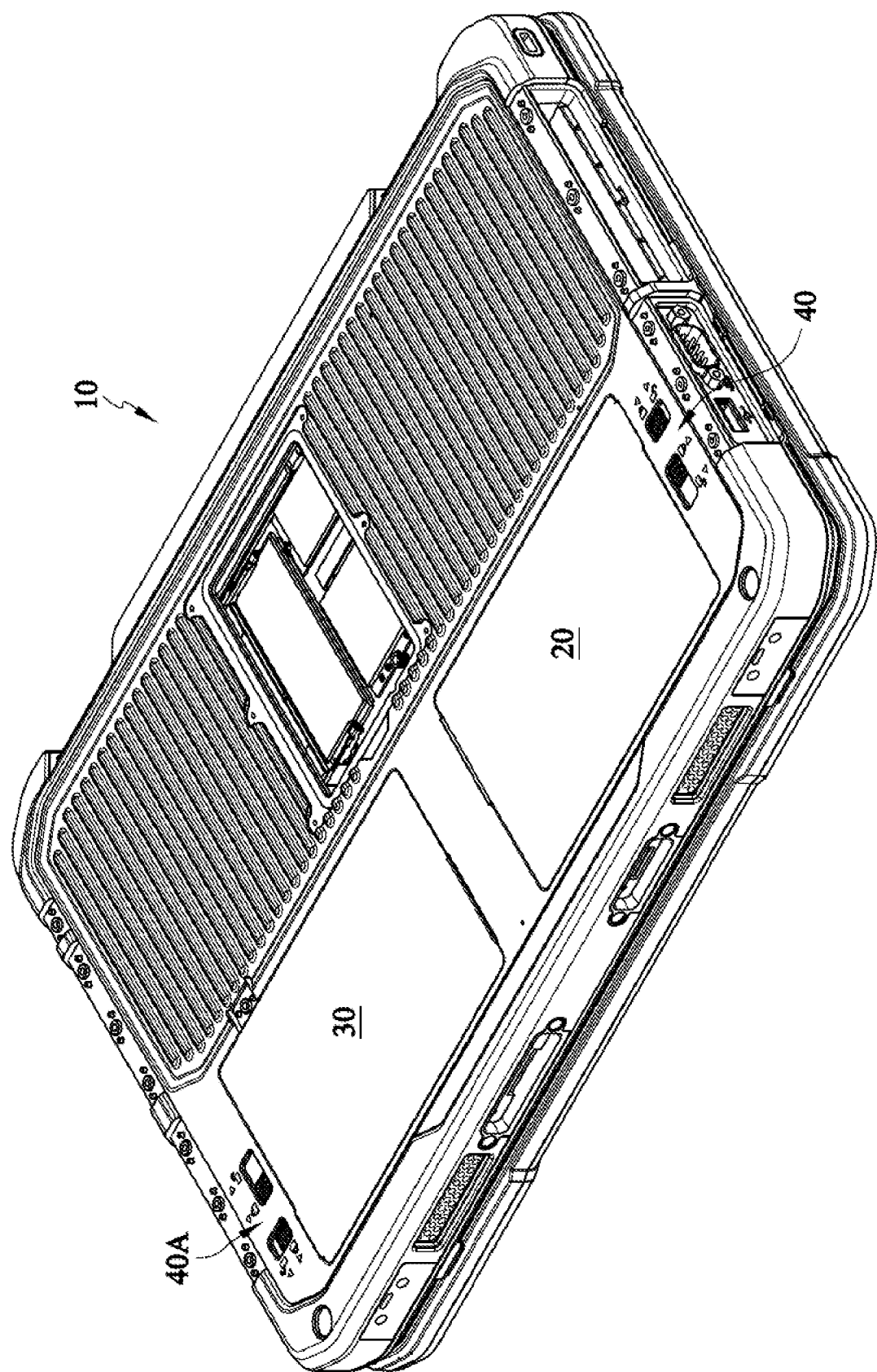
FIG. 1 is a perspective view from a back side of a portable electronic device in accordance with the present invention.
Figure 2:
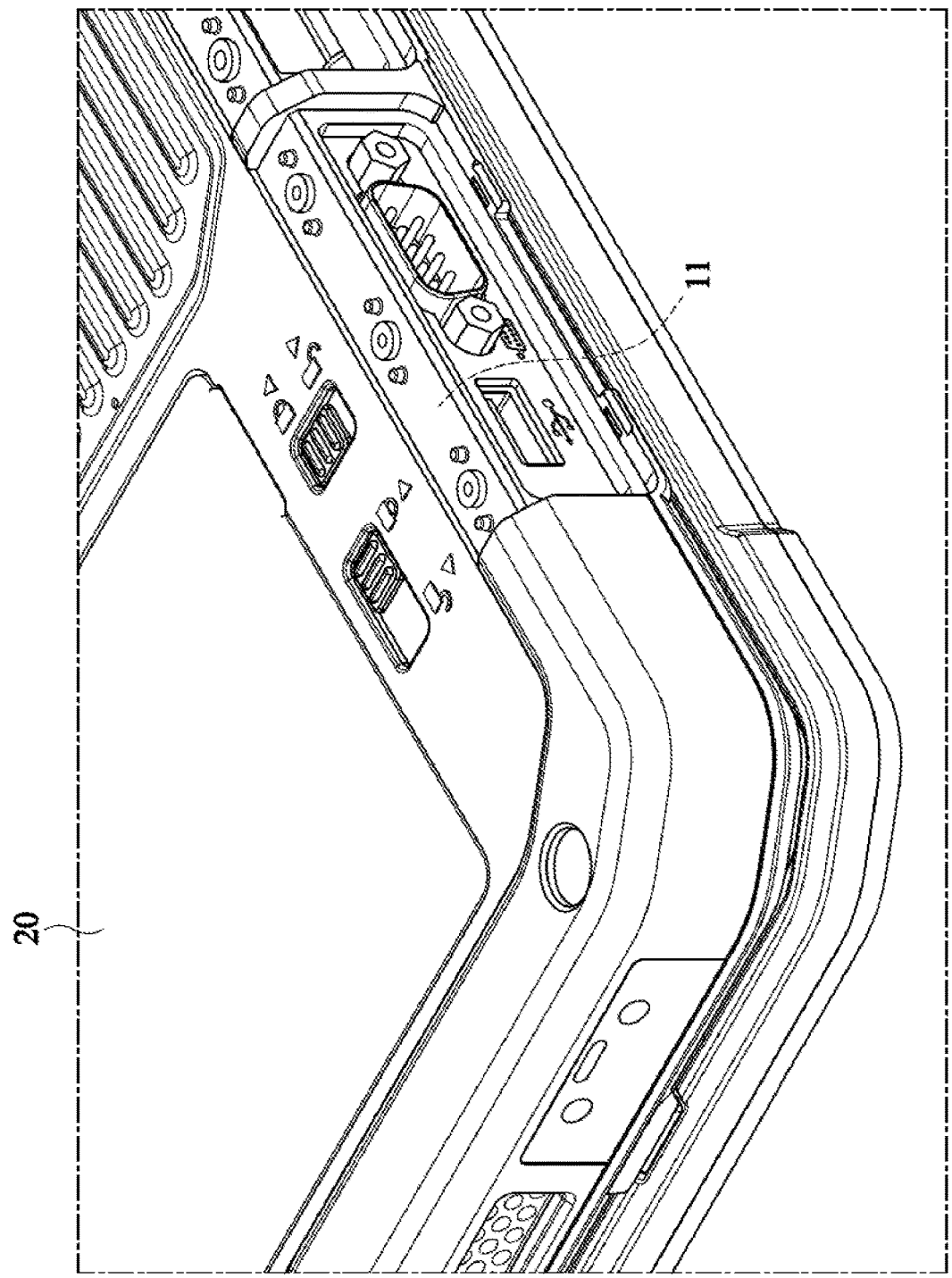
FIG. 2 is a partially enlarged perspective view of the portable electronic device in FIG. 1.
Figure 3:
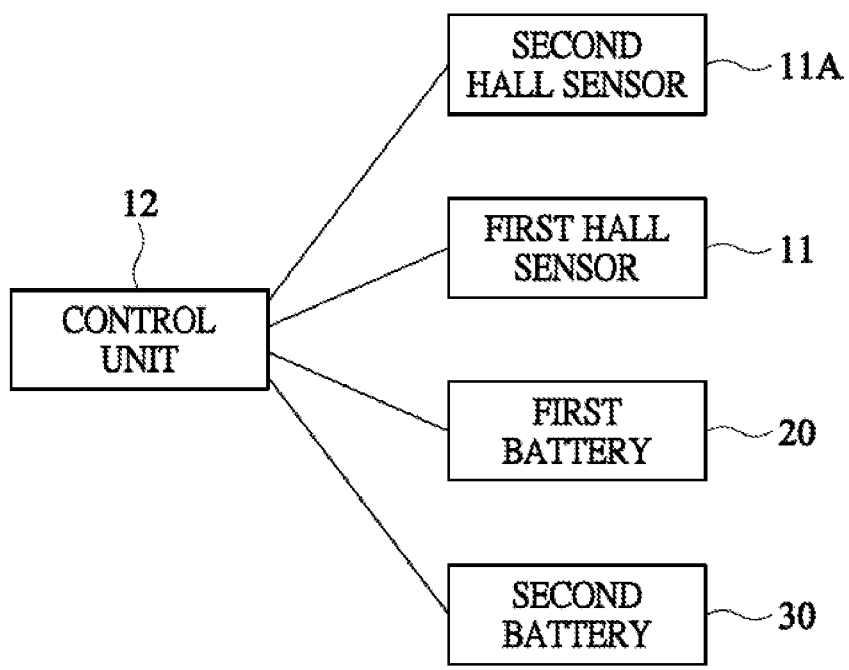
FIG. 3 is a block diagram of partially components of the portable electronic device in FIG. 1.

With reference to FIGS. 1 and 3, a portable electronic device in accordance with the present invention comprises a casing 10, a first battery 20, a second battery 30, a first battery switching assembly 40 and a second battery switching assembly 40A. A first Hall sensor 11 and a second Hall sensor 11A are disposed in the casing 10. The first Hall sensor 11 is disposed adjacent to the first battery switching assembly 40. The second Hall sensor 11A is disposed adjacent to the second battery switching assembly 40A. The casing 10 comprises a control unit 12. The first and second Hall sensors 11, 11A are electrically connected to the control unit 12.

With reference to FIGS. 2 to 5, the first and second batteries 20, 30 are disposed detachably on the casing 10 and are electrically connected to the control unit 12. The first and second batteries 20, 30 alternately or simultaneously supply power to the electronic components in the casing 10, depending on the performance of the portable electronic device. In one embodiment, the first battery 20 is first used to supply power to all the electronic components in the casing 10, and then the second battery 30 is switched to supply power to all the electronic components in the casing 10 if the first battery 20 is running out. The first and second batteries 20, 30 take turns to supply power. A first holding element 50 is provided on a periphery of the first battery 20. A second holding element 50A is provided on a periphery of the second battery 30.

Figure 4:
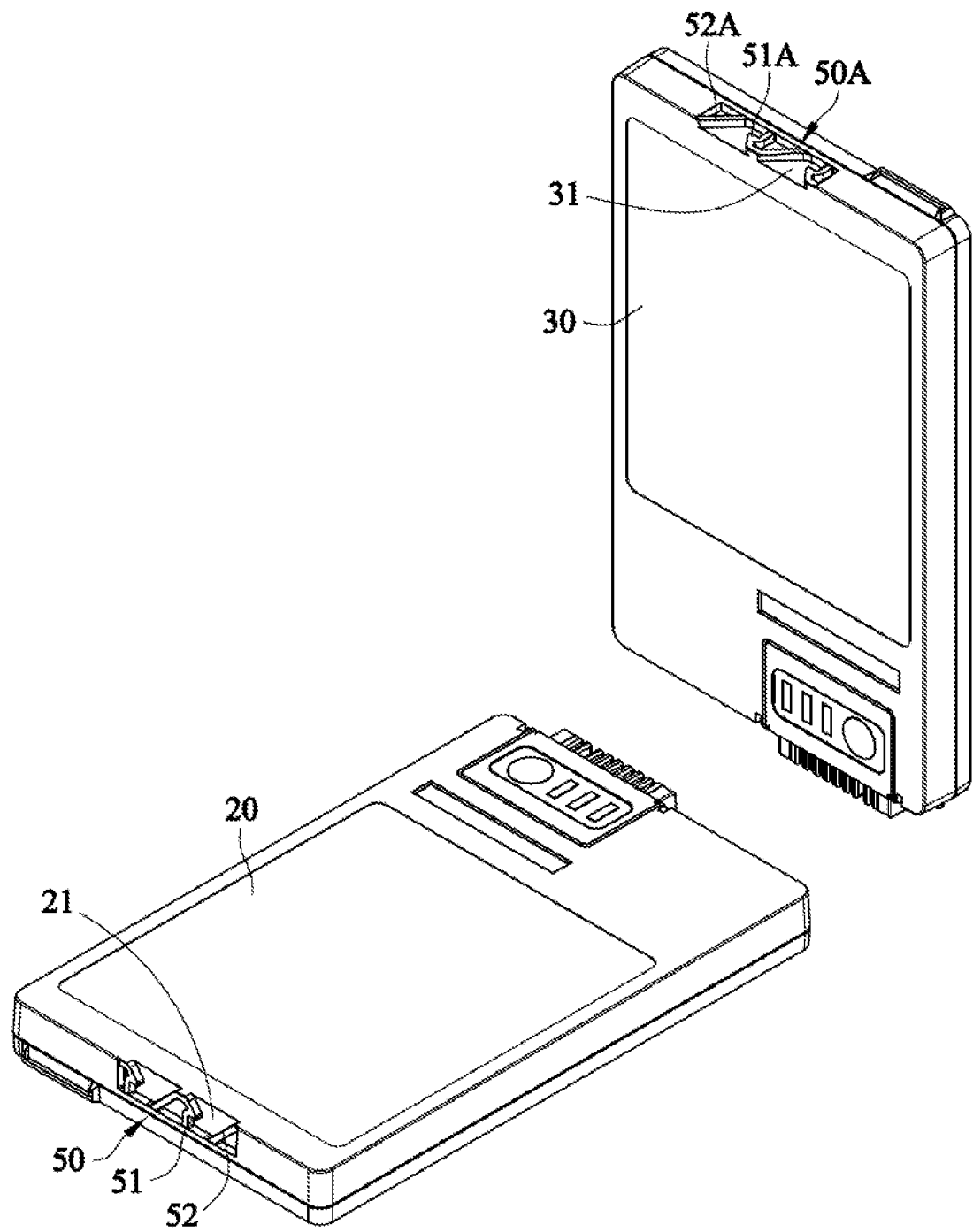
FIG. 4 is a perspective view of a first battery and a second battery of the portable electronic device in FIG. 1.
Figure 6:
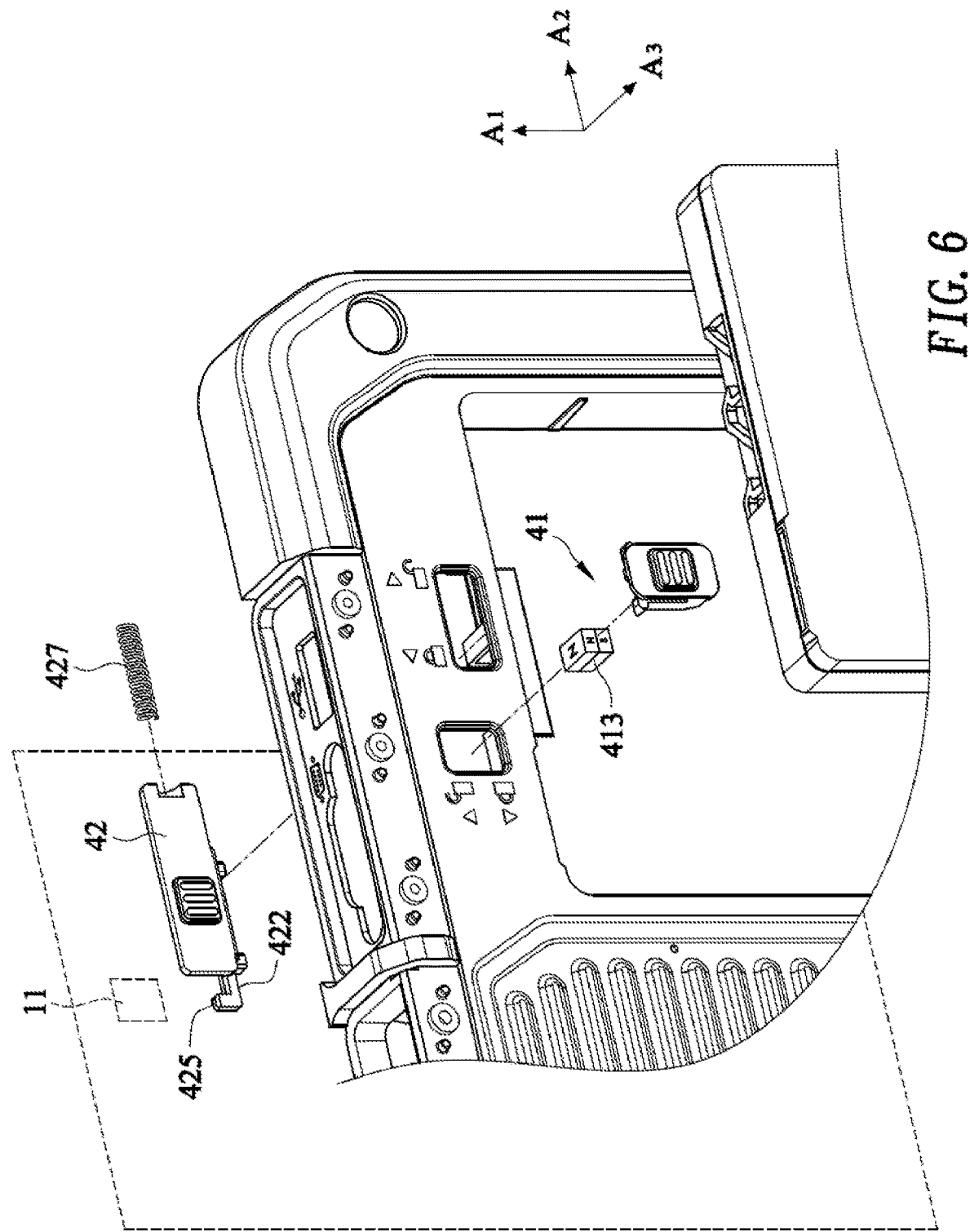
FIG. 6 is another exploded perspective view of partially components of the portable electronic device in FIG. 1.
Figure 7:
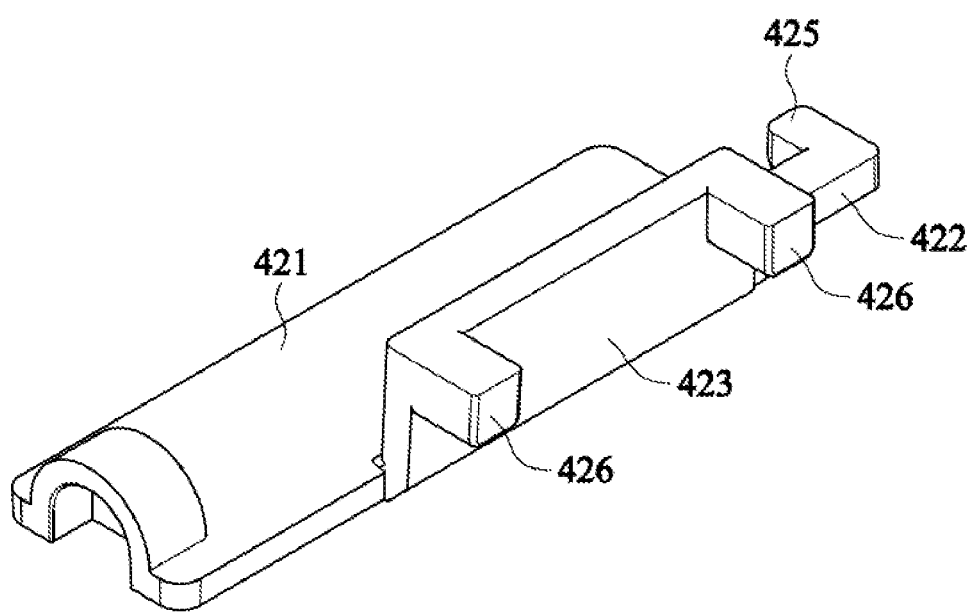
FIG. 7 is a perspective view of a limiting unit of the portable electronic device in FIG. 1.

With reference to FIGS. 4 and 6, the first battery switching assembly 40 is disposed on the casing 10 and corresponds to the first holding element 50. The second battery switching assembly 40A is disposed on the casing 10 and corresponds to the second holding element 50A. Each battery switching assembly 40, 40A has a primary fastener 41 and a secondary fastener 42. The primary fastener 41 has a body 411, an internal latch 412 and a magnetic element 413. The internal latch 412 and the magnetic element 413 are disposed on the body 411. The secondary fastener 42 has a body 421, an internal latch 422 and an external latch 423. The internal latch 422 and the external latch 423 are disposed on the body 421.

With reference to FIGS. 5 to 8B, the body 411 of the primary fastener 41 is moved along a first axis $A_1$, and the body 421 of the secondary fastener 42 is moved along a second axis $A_2$. The first axis $A_1$ and the second axis $A_2$ form an angle greater than 0 degrees. In one embodiment, the first axis $A_1$ is perpendicular to the second axis $A_2$. The internal latch 412 of the primary fastener 41 has a first side 412a and a second side 412b. The first side 412a faces to the body 421 of the secondary fastener 42. The internal latch 422 of the secondary fastener 42 is disposed along the second axis $A_2$ and has a hook 425 forming along the first axis $A_1$. When the internal latch 412 of the primary fastener 41 engages with the internal latch 422 of the secondary fastener 42, the hook 425 abuts against the second side 412b of the internal latch 412. Thus, the internal latch 422 of the secondary fastener 42 hooks the end of the internal latch 412 of the primary fastener 41.

Figure 5:
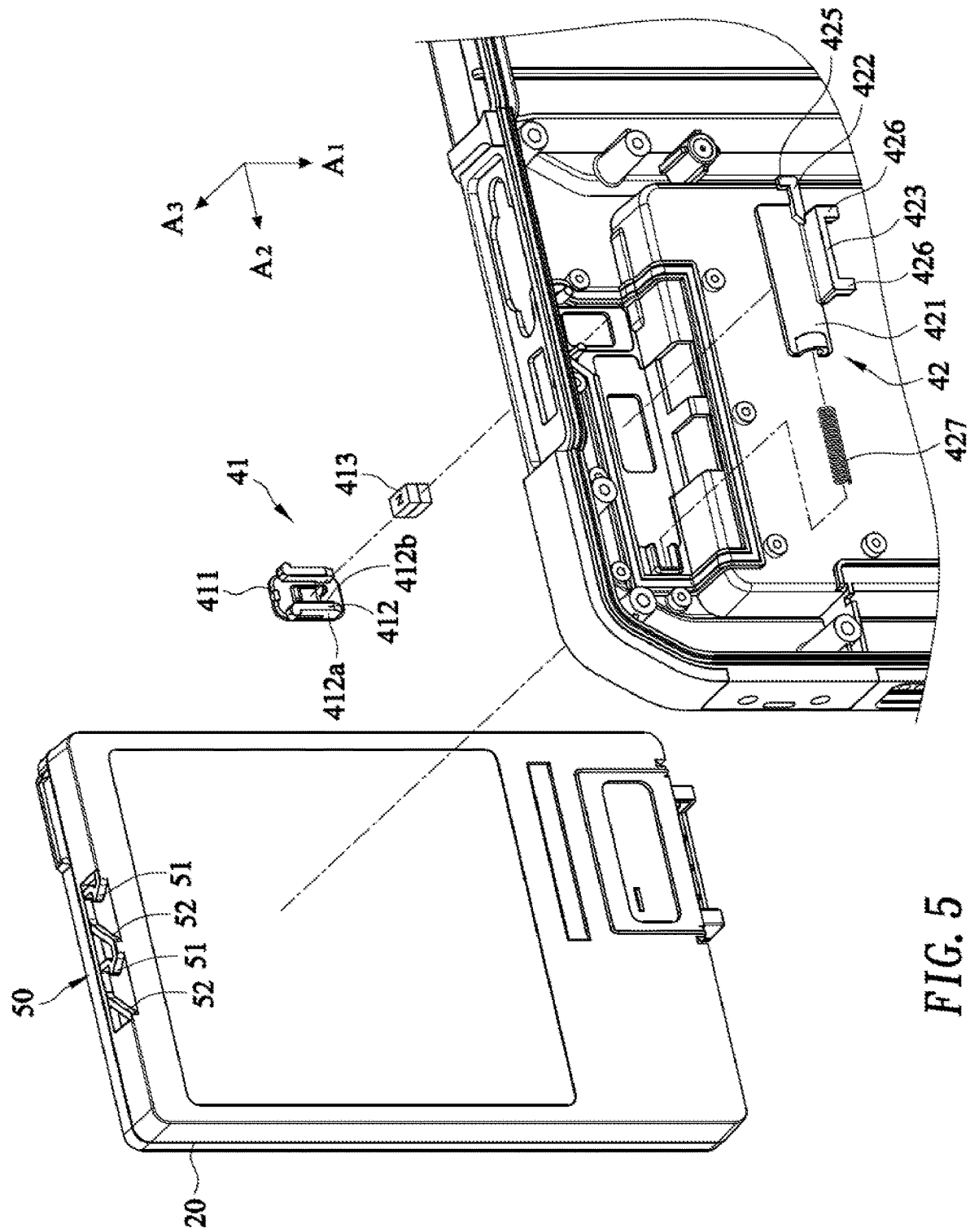
FIG. 5 is an exploded perspective view of partially components of the portable electronic device in FIG. 1.

With reference to FIGS. 4 to 7, the body 421 of the secondary fastener 42 is moved along the second axis $A_2$. The corresponding first battery 20 or second battery 30 is moved along a third axis $A_3$. The third axis $A_3$ and the plane formed by the first axis $A_1$ and the second axis $A_2$ form an angle greater than 0 degrees. In one embodiment, the third axis $A_3$ is respectively perpendicular to the first axis $A_1$ and the second axis $A_2$. The external latch 423 is disposed along the second axis $A_2$ and has at least one protrusion 426. The first holding element 50 is disposed in a recess 21 of the periphery of the first battery 20. The second holding element 50A is disposed in a recess 31 of the periphery of the second battery 30. Each holding element 50, 50A has at least one seat 51, 51A and at least one inclined surface 52, 52A. As shown in FIG. 5, the secondary fastener 42 has a spring 427. One end of the spring 427 abuts against the casing while the other end of the spring 427 abuts against one end of the body 421 of the secondary fastener 42 to push the body 421 to move toward the body 411 of the primary fastener 41.

The following description of the operation of the first battery 20 is used as an example to describe the overall operation, and the same operation can also be operated on the second battery 30.

Figure 8B:
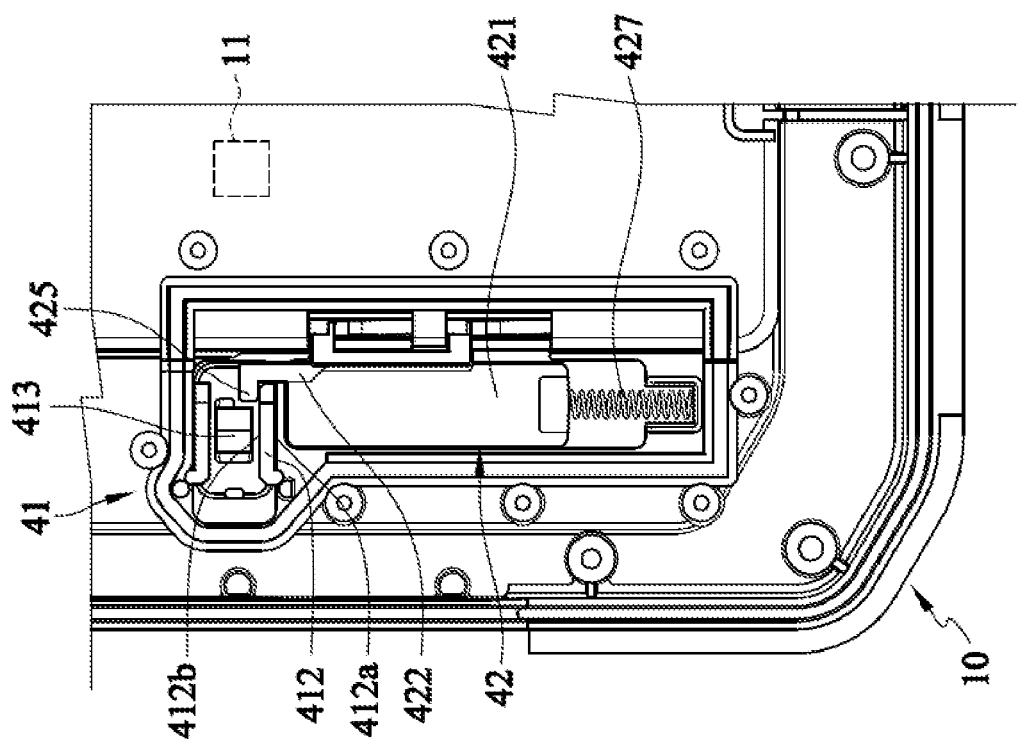
FIG. 8B is an enlarged operational top side view of the primary fastener and the secondary fastener of the portable electronic device in FIG. 1, showing the primary fastener engaging with the secondary fastener.
Figure 8A:
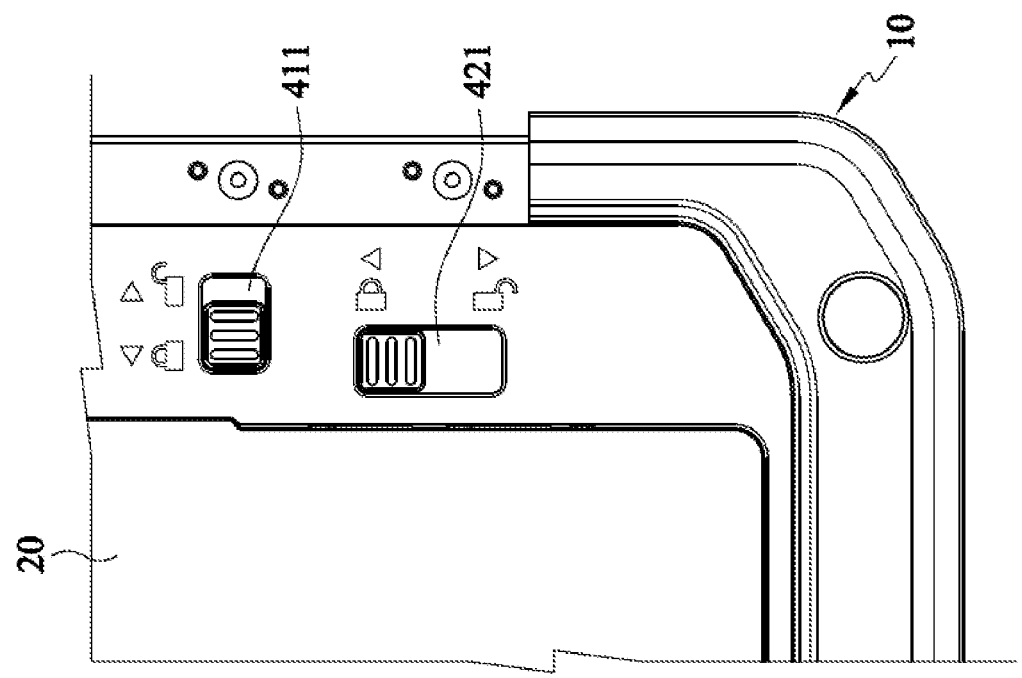
FIG. 8A is an enlarged operational back side view of a primary fastener and a secondary fastener of the portable electronic device in FIG. 1, showing the primary fastener engaging with the secondary fastener.
Figure 8C:
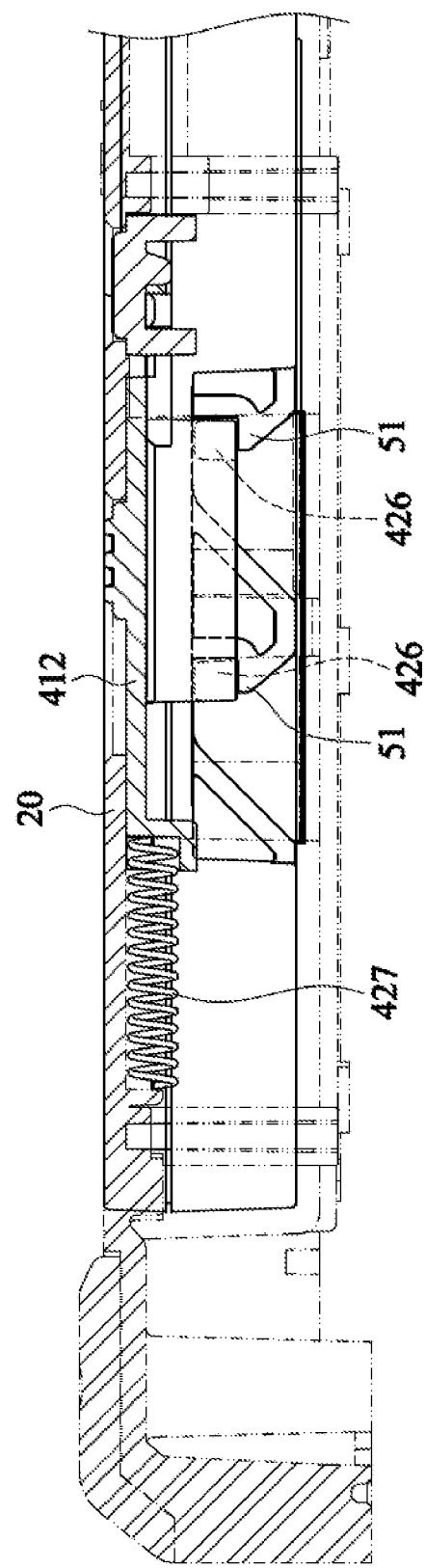
FIG. 8C is an enlarged operational side view in partial section of the secondary fastener and the first battery of the portable electronic device in FIG. 1, showing the secondary fastener locking the first battery.

In general use as shown in FIGS. 8A, 8B and 8C, the internal latch 412 of the primary fastener 41 engages with the internal latch 422 of the secondary fastener 42. The external latch 423 of the secondary fastener 42 engages with the first holding element 50 of the first battery 20. Thus, the first battery 20 cannot be detached from the casing 10. In one embodiment, the hook 425 of the internal latch 422 of the secondary fastener 42 abuts against the second side 412b of the internal latch 412 so that the internal latch 412 of the primary fastener 41 engages with the internal latch 422 of the secondary fastener 42. The protrusion 426 abuts against the corresponding seat 51 so that the external latch 423 of the secondary fastener 42 engages with the first holding element 50 of the first battery 20.

Figure 9B:
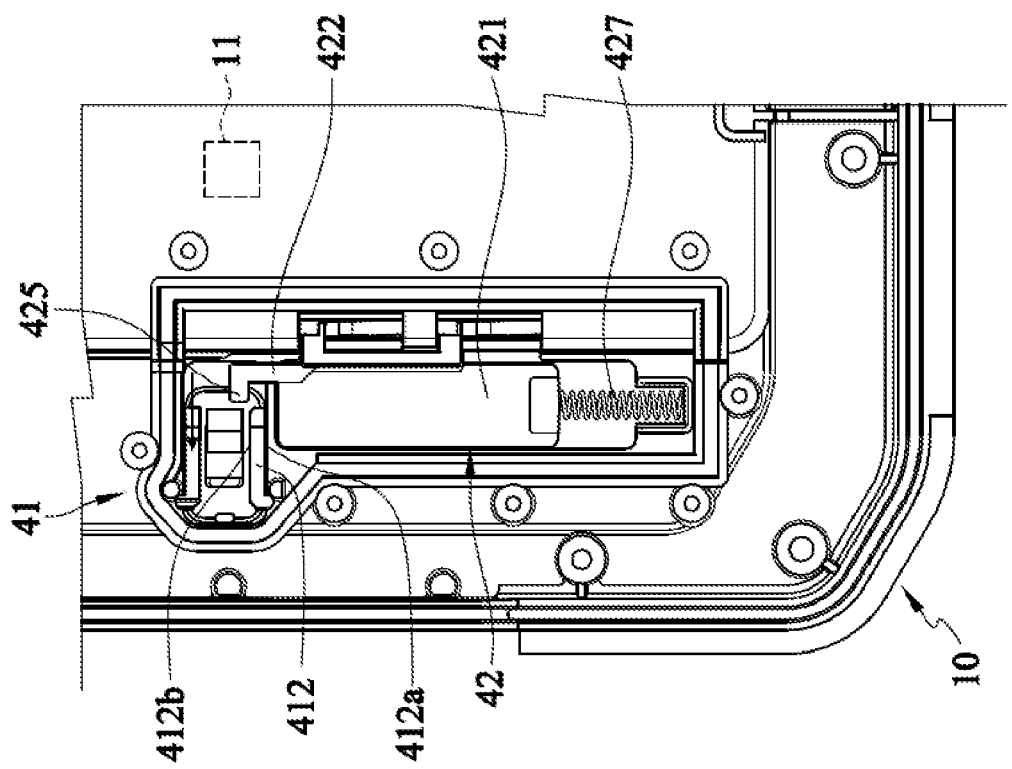
FIG. 9B is an enlarged operational top side view of the primary fastener and the secondary fastener of the portable electronic device in FIG. 1, showing the primary fastener disengaging with the secondary fastener.
Figure 9A:
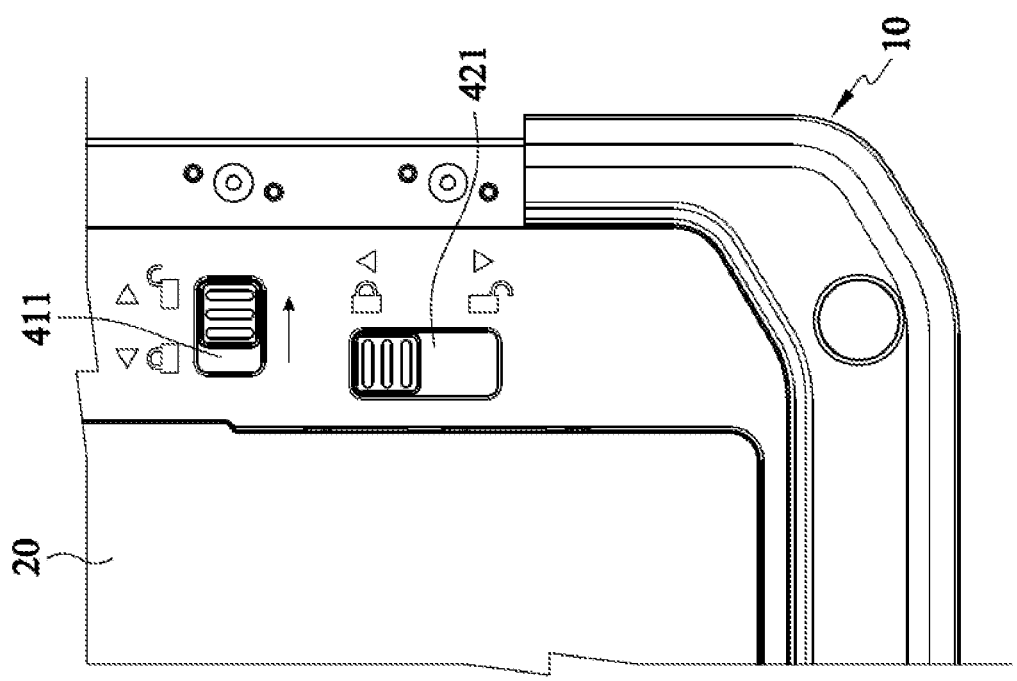
FIG. 9A is an enlarged operational back side view of the primary fastener and the secondary fastener of the portable electronic device in FIG. 1, showing the primary fastener disengaging with the secondary fastener.
Figure 10B:
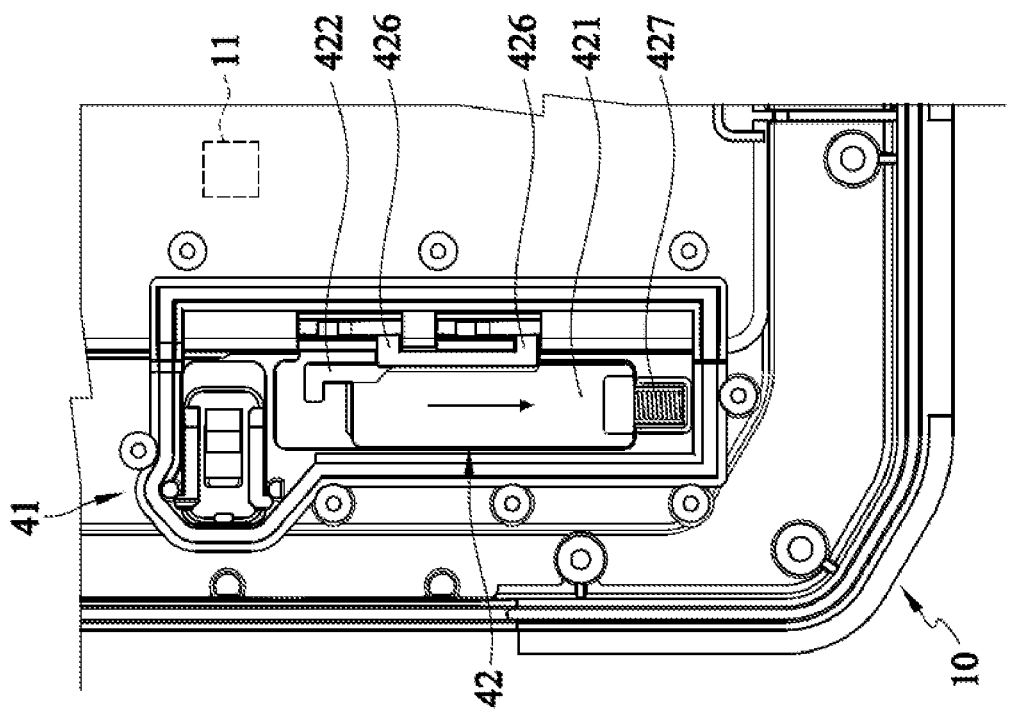
FIG. 10B is an enlarged operational top side view of the primary fastener and the secondary fastener of the portable electronic device in FIG. 1, showing the secondary fastener releasing the first battery.
Figure 10A:
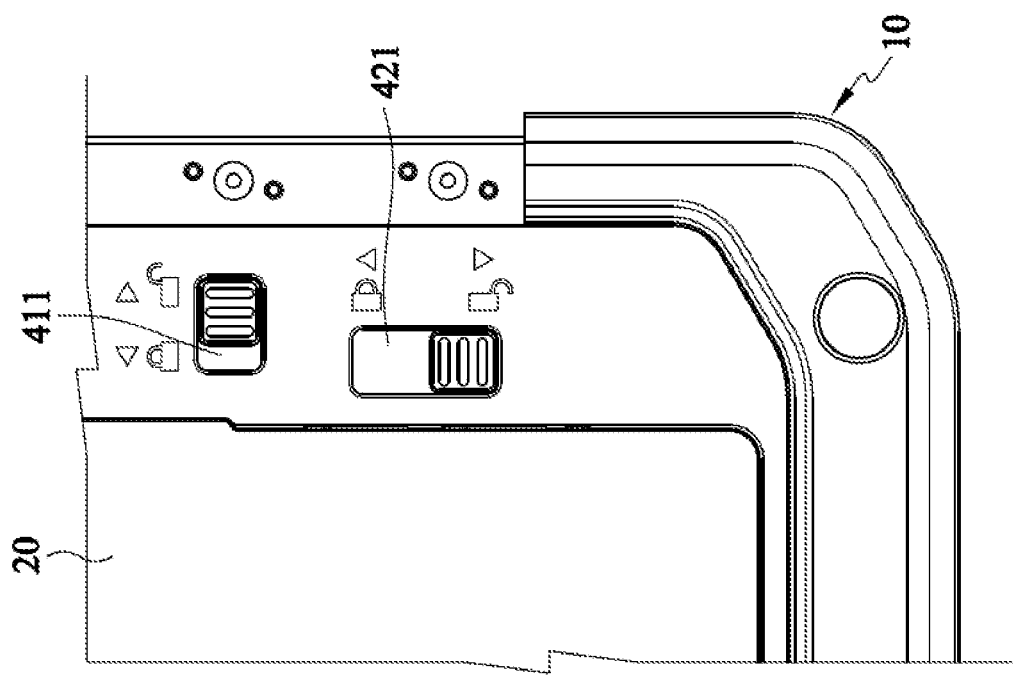
FIG. 10A is an enlarged operational back side view of the primary fastener and the secondary fastener of the portable electronic device in FIG. 1, showing the secondary fastener releasing the first battery.
Figure 10C:
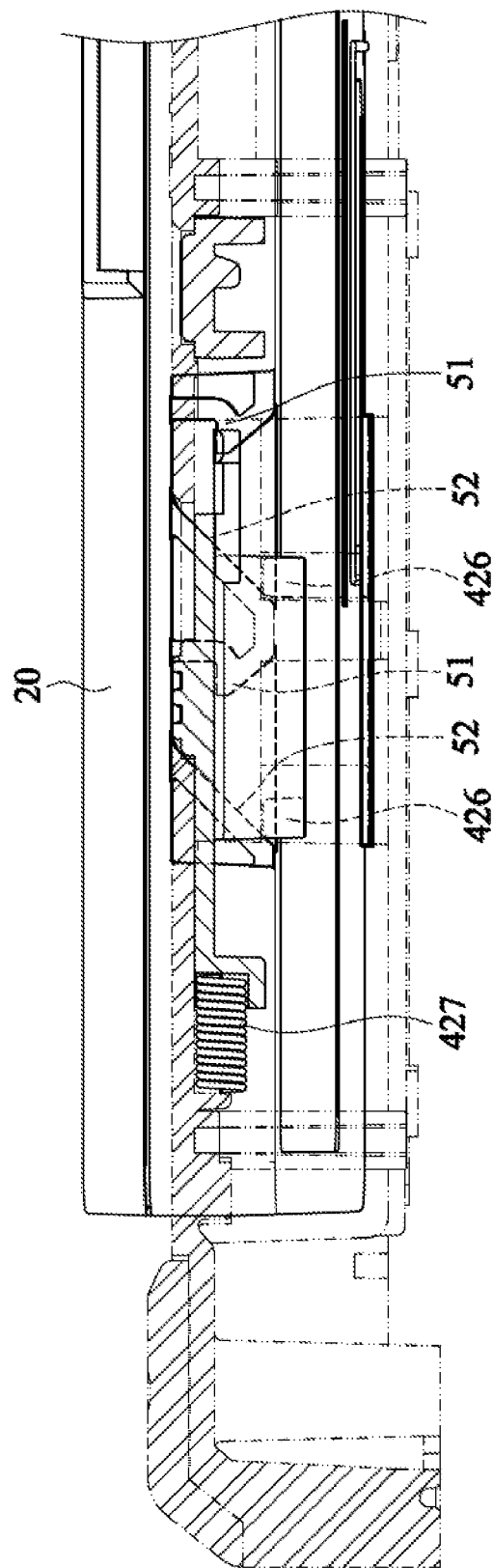
FIG. 10C is an enlarged operational side view in partial section of the secondary fastener and the first battery of the portable electronic device in FIG. 1, showing the secondary fastener releasing the first battery.
Figure 10D:
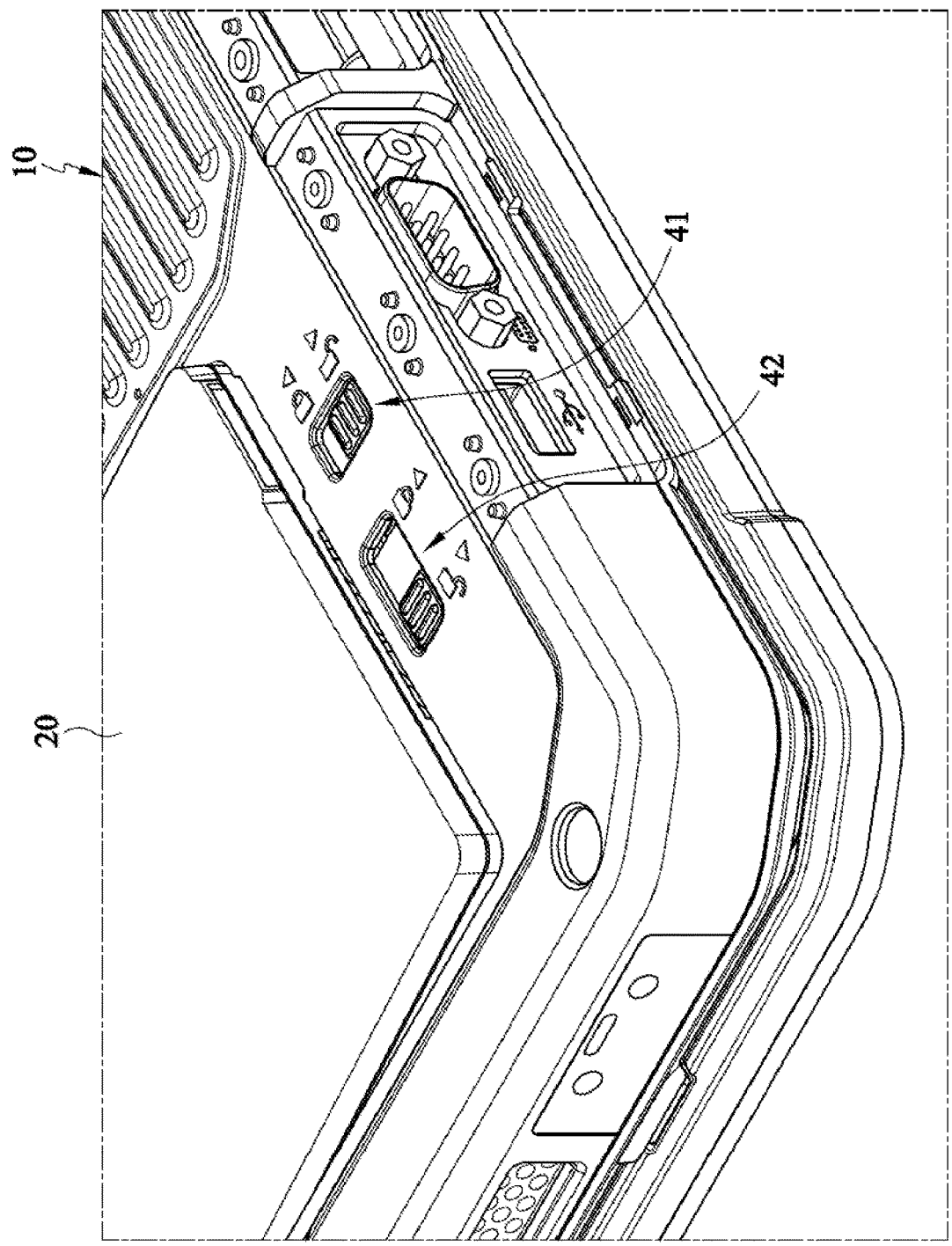
FIG. 10D is an enlarged operational perspective view of the portable electronic device, showing the first battery disengaging from the casing.
Figure 11:
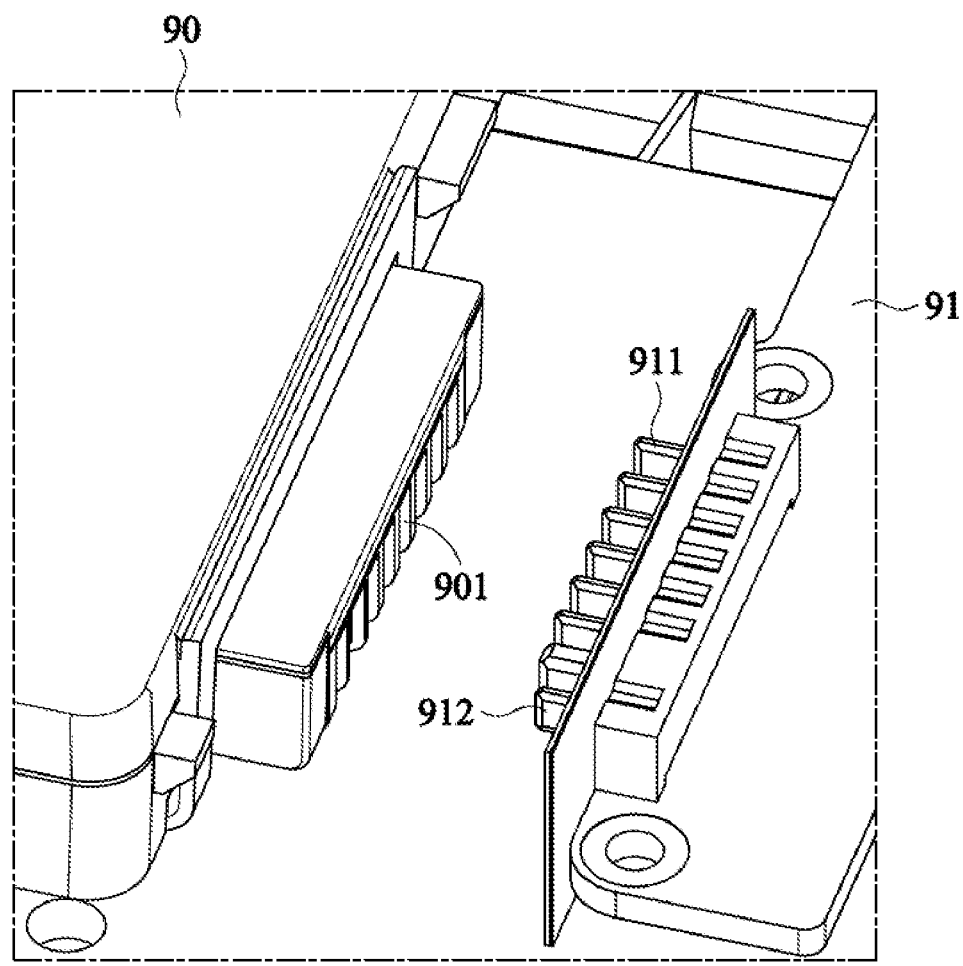
FIG. 11 is an enlarged perspective view of the battery and the casing of a portable device according to a prior art.

With reference to FIGS. 9A and 9B in view of FIG. 3, when the body 411 of the primary fastener 41 is pushed to move along the first axis $A_1$, the internal latch 412 of the primary fastener 41 disengages from the internal latch 422 of the secondary fastener 42. The magnetic element 413 is also moved with the body 411 of the primary fastener 41, so that the distance between the magnetic element 413 and the first Hall sensor 11 changes. Then the first Hall sensor 11 transmits a first signal to the control unit 12, and the control unit 12 knows that the first battery 20 is about to be removed. Therefore, the control unit 12 switches on the power supply of the second battery 30, and then the control unit 12 turns off the power supply of the first battery 20. That is to say, the electronic components in the casing 10 originally powered by the first battery 20 are changed to be powered by the second battery 30, or at least one application program is closed, so that the power supplied by the second battery 30 is sufficient to supply the portable electronic device for continuous operation. Similarly, when the distance between the magnetic element 413 of the second battery switching assembly 40A and the second Hall sensor 11A changes, the second Hall sensor 11A transmits a second signal to the control unit 12, and the control unit 12 knows that the second battery 30 is about to be removed. The control unit 12 turns off the power supply of the second battery 30 and switches on the first battery 20. The electronic components in the casing 10 originally powered by the second battery 30 are changed to be powered by the first battery 20, or at least one application program is closed, so that the power supplied by the first battery 20 is sufficient to supply the portable electronic device for continuous operation.

With reference to FIGS. 10A, 10B, 10C and 10D, since the internal latch 412 of the primary fastener 41 disengages from the internal latch 422 of the secondary fastener 42, the body 421 of the secondary fastener 42 is no longer limited by the body 411 of the primary fastener 41. The user may push the body 421 of the secondary fastener 42 to move along the second axis $A_2$, so that the external latch 423 of the secondary fastener 42 releases the first holding element 50. Then the first battery 20 is able to be detached from the casing 10. In one embodiment, the protrusion 426 is moved by the external latch 423 of the secondary fastener 42 to leave the seat 51, so that the external latch 423 of the secondary fastener 42 releases the first holding element 50. Further, when the protrusion 426 is moved, the protrusion 426 abuts against the inclined surface 52 of the first holding element 50 to push up the first holding element 50. Then the first battery 20 is forced to move along the third axis $A_3$. Therefore, during the movement of the body 421 of the second fastener 42, the first battery 20 is not only released but also pushed out of the casing 10. Thus, it is convenient for the user to take out the first battery 20.

In conclusion, with cooperation between the magnetic elements 413 of the primary fasteners 41 and the first and second Hall sensors 11, 11A, the control unit 12 has already begun preparations for the first battery 20 or the second battery 30 to be removed when the primary fastener 41 is actuated. However, the first battery 20 or the second battery 30 must wait until the secondary fastener 42 is actuated before it can be truly separated from the casing 10. Then, the time difference between releasing the engagement state of the primary fastener 41 and the secondary fastener 42 respectively gives the control unit 12 sufficient response time. That is to say, the total time for a user uses his finger to push the primary fastener 41 and then to push the secondary fastener must be greater than 0.03 seconds. Therefore, enough time is obtained for the control unit 12 to switch the battery or close the application program to maintain the normal operation of the portable electronic device.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A portable electronic device running at least one application program and comprising:
    a casing having
        a control unit;
        a first Hall sensor electrically connecting to the control unit; and
        a second Hall sensor electrically connecting to the control unit;
    a first battery is disposed detachably on the casing and electrically connecting to the control unit;
    a first holding element disposed on a periphery of the first battery;
    a second battery is disposed detachably on the casing and electrically connecting to the control unit;
    a second holding element disposed on a periphery of the first battery;
    a first battery switching assembly is disposed on the casing, corresponding to the first battery;
    a second battery switching assembly is disposed on the casing, corresponding to the second battery;
    each battery switching assembly having
        a primary fastener having
            a body;
            an internal latch disposed on the body; and
            a magnetic element disposed on the body; and
        a secondary fastener having
            a body;
            an internal latch disposed on the body of the secondary fastener and selectively engaging with the internal latch of the primary fastener; and
            an external latch disposed on the body of the secondary fastener;
    the external latch of the first battery switching assembly selectively engaging with the first holding element;
    the external latch of the second battery switching assembly selectively engaging with the second holding element, wherein
        when the external latch of the first battery switching assembly engages with the first holding element, the first battery is locked on the casing;
        when the external latch of the second battery switching assembly engages with the second holding element, the second battery is locked on the casing;
        when the internal latch of the primary fastener disengages from the internal latch of the secondary fastener, the external latch is allowed to be disengaged from the first or second holding element;
        when the internal latch of the primary fastener of the first battery switching assembly disengages from the internal latch of the secondary fastener of the first battery switching assembly, the first Hall sensor transmits a first signal to the control unit, and then the control unit turns off a power supply of the first battery, and uses the second battery to supply power, or the at least one application program is closed; and
        when the internal latch of the primary fastener of the second battery switching assembly disengages from the internal latch of the secondary fastener of the second battery switching assembly, the second Hall sensor transmits a second signal to the control unit, and then the control unit turns off a power supply of the second battery, and uses the first battery to supply power, or the at least one application program is closed.

2. The portable electronic device as claimed in claim 1, wherein
    when the internal latch of the primary fastener disengages from the internal latch of the secondary fastener, the body of the primary fastener is allowed to move along a first axis and the body of the secondary fastener is allowed to move along a second axis;
    the first axis and the second axis form an angle greater than 0 degrees;
    when the external latch of the secondary fastener disengages from the first or the second holding element, the first or second battery is allowed to move along a third axis;
    the third axis and a plane form by the first axis and the second axis form an angle greater than 0 degrees.

3. The portable electronic device as claimed in claim 2, wherein
    the internal latch of the primary fastener has
        a first side facing the body of the secondary fastener; and
        a second side opposing to the first side;
    the internal latch of the secondary fastener is disposed along the second axis and has a hook forming along the first axis; and
    when the internal latch of the primary fastener disengages from the internal latch of the secondary fastener, the hook abuts against the second side of the internal latch of the primary fastener.

4. The portable electronic device as claimed in claim 2, wherein
    the external latch of the secondary fastener is disposed along the second axis and has at least one protrusion forming along the first axis;
    each holding element has at least one seat; and
    when the at least one protrusion abuts against the at least one seat of a corresponding holding element, the external latch of the secondary fastener engages the corresponding holding element.

5. The portable electronic device as claimed in claim 3, wherein the external latch of the secondary fastener is disposed along the second axis and has at least one protrusion forming along the first axis;

each holding element has at least one seat; and when the at least one protrusion abuts against the at least one seat of a corresponding holding element, the external latch of the secondary fastener engages the corresponding holding element.

6. The portable electronic device as claimed in claim 4, wherein secondary fastener has a spring to push the secondary fastener to move toward the primary fastener.

7. The portable electronic device as claimed in claim 5, wherein secondary fastener has a spring to push the secondary fastener to move toward the primary fastener.

* * * * *